United States Patent
Ding et al.

(10) Patent No.: US 6,733,909 B2
(45) Date of Patent: May 11, 2004

(54) FUEL CELL POWER PLANT WITH ELECTROCHEMICAL ENHANCED CARBON MONOXIDE REMOVAL

(75) Inventors: Yi Ding, Canton, MI (US); Joseph Carl Burba, Ramona, CA (US)

(73) Assignee: Ford Motor Company, Dearborn, MI (US)

(*) Notice: Subject to any disclaimer, the term of this patent is extended or adjusted under 35 U.S.C. 154(b) by 151 days.

(21) Appl. No.: 09/848,397

(22) Filed: May 3, 2001

(65) Prior Publication Data

US 2002/0164507 A1 Nov. 7, 2002

(51) Int. Cl.$^7$ ................................. H01M 8/18
(52) U.S. Cl. ........................ 429/21; 429/12; 429/13; 429/19
(58) Field of Search .................. 429/12, 13, 19, 429/21

(56) References Cited

U.S. PATENT DOCUMENTS

| | | |
|---|---|---|
| 4,910,099 A | 3/1990 | Gottesfeld |
| 5,248,566 A | 9/1993 | Kumar et al. |
| 5,336,570 A | 8/1994 | Dodge, Jr. |
| 5,432,021 A | 7/1995 | Wilkinson et al. |
| 5,482,680 A | 1/1996 | Wilkinson et al. |
| 5,518,831 A | 5/1996 | Tou et al. |
| 5,527,632 A | 6/1996 | Gardner |
| 5,910,378 A | 6/1999 | Debe et al. |
| 5,925,476 A | 7/1999 | Kawatsu |
| 5,976,724 A | 11/1999 | Bloomfield |
| 6,001,499 A | 12/1999 | Grot et al. |
| 6,010,675 A | 1/2000 | Trocciola et al. |
| 6,042,959 A | 3/2000 | Debe et al. |
| 6,063,516 A | 5/2000 | Grot et al. |
| 6,063,519 A | 5/2000 | Barker |
| 6,245,214 B1 * | 6/2001 | Rehg et al. ............ 205/764 |

OTHER PUBLICATIONS

Vayenas, C. G et al. "Non–faradaic electrochemical modification of catalytic activity using ionic and mixed conducting ceramics," Proceedings—Electrochemical Society (1998), 97–24 (Ionic and Mixed Conducting Ceramic), 509–529.*

Yentekakis, I. V. et al. "Catalysis, electrocatalysis and electrochemical promotion of the steam reforming of methane over Ni film and Ni–YSZ cermet anodes," Ionics (1995), 1(5 & 6), 491–498.*

Vayenas et al., Modern Aspects of Electrochemistry. No. 29, J. O. Bockris et. al., p 57 (1996).

Mar'ina & Sobyanin, The effect of electrochemical oxygen pumping on the rate of CO oxidation an Au electrode–catalyst, Catalyst Letters 13, (1992) 61.

Yentekakis & Vayenas, J. Cata., 149 (1994) 238.

Liu et al., SAE Technical Paper. 2000–01–0379.

* cited by examiner

*Primary Examiner*—Patrick Ryan
*Assistant Examiner*—Dah-Wei Yuan
(74) *Attorney, Agent, or Firm*—Tung & Associates; Carlos Hanze

(57) ABSTRACT

The invention is an improved fuel cell system suited for application in a vehicle. Specifically, the invention provides an improved system to remove CO emissions that has a rapid dynamic response (about 1 second) and can operate over a wide range of temperatures (between 0 and 800 degrees Celsius). The fuel cell system comprises hydrogen fuel, a CO removal system based upon non-Faradaic electrochemical modification of catalyst activity (electrochemical promotion), and a fuel cell stack. The CO removal system comprises a catalyst/working electrode, an electrolyte, a counter electrode, and a power source. The CO removal system's intrinsic catalytic rate is greater than an intrinsic electrocatalytic rate. The catalyst can be Pt, Rh, Au, Cu/ZnO, Cu/CuO, ABO3(perovskite), zeolite, and Pd. The power source can be a battery, potentiostat, or galvanostat.

4 Claims, 2 Drawing Sheets

FUEL CELL POWER PLANT WITH ELECTROCHEMICAL ENHANCED CARBON MONOXIDE REMOVAL

BACKGROUND OF THE INVENTION

1. Field of the Invention

The present invention relates generally to electrochemical fuel cells and specifically to a method of electrochemical promotion to increase the speed of carbon monoxide (CO) oxidation in hydrogen production.

2. Discussion of the Prior Art

In an effort to find alternative energy sources, hydrogen can be used in an electrochemical reaction to generate electricity. Generally, the reaction takes place in fuel cells. Fuel cells are known in the prior art for directly converting chemical energy of a fuel to electrical energy. Fuel cell advantages include low emissions, high fuel energy conversion efficiencies, and low noise and vibrations (U.S. Pat. No. 5,248,566 to Kumar, et al.) Despite the advantages, various problems are presented by existing fuel cell technology.

Proton exchange membrane (PEM) fuel cells are well known in the prior art and contain a membrane electrode assembly (MEA). The MEA has an anode compartment and a cathode compartment separated by a solid polymer electrolyte membrane. The MEA is sandwiched between a pair of electrically conductive elements that serve as current collectors for the anode and cathode, and contain appropriate channels for distributing the fuel cells' gaseous reactants.

Fuel is provided to the anode and an oxidizer is provided to the cathode; the reaction between the electrodes generates a current flow of electricity. Further, when hydrogen fuel reacts with oxygen, the reaction creates a harmless emission of water. This is certainly desirable over emissions from an internal combustion engine (ICE). The output of electrical energy from the fuel cell is dependent upon a variety of driving conditions, such as gas pressure, cell temperature, and a gas utilization ratio.

The electrodes in the fuel cell typically contain a catalyst to promote the reaction. The catalyst structure should have a low catalyst loading, efficient proton and gas access, electric continuity, low internal electric resistance, and low susceptibility to carbon monoxide (CO) poisoning. The efficiency of the catalyst is affected by contaminants that block hydrogen absorption. By way of example, CO absorbs onto catalysts, such as platinum, at temperatures below 150 degrees Celsius to prevent hydrogen absorption.

PEM fuel cells are sensitive to CO poisoning. Further, PEM fuel cells cannot operate at high temperatures. As a result, a desire exists to improve fuel cell performance to lower CO levels and allow the fuel cells to operate at a wider range of temperatures.

U.S. Pat. No. 4,910,099 to Gottesfeld, discloses an invention in which oxygen is injected into a hydrogen fuel stream ahead of a PEM fuel cell that contains CO. A surface reaction occurs (even at PEM operating temperatures below 100 degrees Celsius) to remove CO and restore electrode surface area so that the hydrogen reaction may generate current. Thus, a fuel stream from a PEM fuel cell may be formed from a methanol source using conventional reforming processes for producing hydrogen. Unfortunately, this method will reduce the fuel cell working voltage and thus reduce the system efficiency.

U.S. Pat. No. 5,248,566 to Kumar et al., describes a system in which a partial oxidation reformer is connected to the fuel tank and a fuel cell. The partial oxidation reformer receives hydrogen-containing fuel, water, and air and, in the presence of an oxidizing and reforming catalyst, produces a hydrogen-containing gas. The gas is then sent to the fuel cell negative electrode where, in combination with air sent to the positive electrode, power is produced to operate an electric motor. The invention further contains a zone where carbon monoxide, in the presence of an oxidation or methanation catalyst, is converted into carbon dioxide or methane and an afterburner unit that converts exhaust from the negative electrode of the fuel cell to heat and water.

U.S. Pat. No. 5,336,570 to Dodge, Jr., discloses a hydrogen fuel cell that obtains improved breathability and hydrogen sealing. The proton exchange membrane in the fuel cell is clamped between two catalytic electrodes. Although this prior art deals with hydrogen power cells, the invention does not relate to CO removal.

Prior art reveals other methods, such as selective oxidation, to reduce CO concentration. U.S. Pat. No. 5,482,680 to Wilkinson et al., discloses a method for using selective oxidation, within the fuel cell itself for removing carbon monoxide present in the incoming reactant stream. The catalyst selectively oxidizes carbon monoxide, contained in the fuel stream passageway, to carbon dioxide. Carbon monoxide produced by a reverse water-shift is also oxidized. Additionally, U.S. Pat. No. 5,432,021 to Wilkinson et al., reveals another method for selective oxidation. This method and apparatus oxidizes the carbon monoxide present in the incoming fuel stream and/or present in the reverse water shift to carbon dioxide. U.S. Pat. No. 6,010,675 to Trocciola et al., discloses a method and apparatus for removing CO from a gaseous media. The CO concentration is selectively reduced by selective catalytic oxidation. The oxidation occurs in the presence of gaseous oxygen by passing the gaseous medium through a catalyst. The catalyst oxidizes the CO in an endothermic reaction at a controlled temperature.

Unfortunately, the above-mentioned selective CO oxidation or water shifting reaction is slow to respond to load changes. The present invention proposes using electrochemical promotion to improve CO removal in a fuel cell system.

SUMMARY OF THE INVENTION

Accordingly, an object of the present invention is to provide an improved fuel cell power plant with electrochemical enhanced carbon monoxide removal from electrochemical promotion.

It is a further object of the present invention to provide an improved fuel cell power plant with electrochemical enhanced carbon monoxide removal that is easy to implement.

It is a further object of the present invention to provide a CO removal method and system for pure hydrogen production with a fuel reformer, based upon non-Faradaic electrochemical modification of catalyst activity (electrochemical promotion). By applying a potential, or small current, on the catalyst, catalytic activity can be greatly enhanced.

It is a further object of the present invention to provide an improved fuel cell power plant with electrochemical enhanced carbon monoxide removal that, with proper application on the catalyst, the catalyst surface working function can be changed and thus the catalytic reaction rate can be changed. This provides a new and useful approach to increase catalyst work efficiency for CO removal and thus reduce fuel cell system size.

It is a further object of the present invention to provide an improved fuel cell power plant with electrochemical enhanced carbon monoxide removal that reduces catalyst working temperature by increasing the catalytic reaction rate. Typically catalysis reaction rate is quite low for CO removal except at relatively high temperatures. The enhanced catalysis rate will make the catalyst high working temperature unnecessary.

It is a further object of the present invention to provide an improved fuel cell power plant with electrochemical enhanced carbon monoxide removal that assures rapid start-up and excellent dynamic response by reducing its working temperature and increasing catalysis reaction efficiency.

It is a further object of the present invention to provide an improved fuel cell power plant with electrochemical enhanced carbon monoxide removal that can precisely control CO removal by varying the applied current or potential on the working electrode.

It is a further object of the present invention to provide an improved fuel cell power plant with electrochemical enhanced carbon monoxide removal where catalysts can include Pt, Rh, Au, Cu/ZnO, Cu/CuO, ABO3 (perovskite), zeolite, and Pd, but not limited to these catalysts.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

The present invention relates to fuel cell systems, and more specifically to an improved fuel cell power plant with electrochemical enhanced carbon monoxide removal using electrochemical promotion.

Electrochemical promotion, as is known in the prior art, can occur upon applying electrical potential to a working electrode/catalyst. An electrocatalytic (net charge-transfer) reaction rate changes in a very profound, controlled and reversible manner. The increase in catalytic rate can be up to a factor of 100 times higher than an open-circuit catalytic rate. It is $3 \times 10^5$ times larger than the change in electrolytic rate. For example, each $O^{2-}$ supplied to the catalyst can cause a catalytic reaction of up to $2 \times 10^5$ chemi-sorbed oxygen atoms.

The first "non-Faradaic" catalytic effect of this type was reported in 1981 by M. Stoukides and C. G. Vayenas, J. Catal., 70(1981)137. This paper reported that when $O_{2-}$ is supplied or removed from Ag catalyst films exposed to ethylene and oxygen, the observed changes in rates of epoxidation and conversion to $CO_2$ can be up to a factor of 500 greater than the rate i/2F of supply or removal of $O_{2-}$ to or from a catalyst surface. Over fifty catalytic chemical reactions have been tested to show electrochemical promotion effects. See generally, C. G. Vayenas, et al., Modern Aspects of Electrochemistry, Number 29, J. O. Bockris et al Eds., p. 57(1996).

Experiments in electrochemical promotion phenomenon indicate that order of magnitude of an absolute value $|\Lambda|$ of Faradaic efficiency $\Lambda$ can be estimated for any reaction, catalyst and solid electrolyte from an approximate expression:

$$|\Lambda|=r_0/(I_0/2F)$$

where $r_0$ is the open-circuit catalytic rate and $I_0$ is an exchange current of a catalyst-solid electrolyte interface. This means that to obtain the electrochemical promotion ($|\Lambda|>1$), it is necessary that an intrinsic catalytic rate, $r_0$, must be higher than an intrinsic electrocatalytic rate $I_0/2F$.

Figure 1:
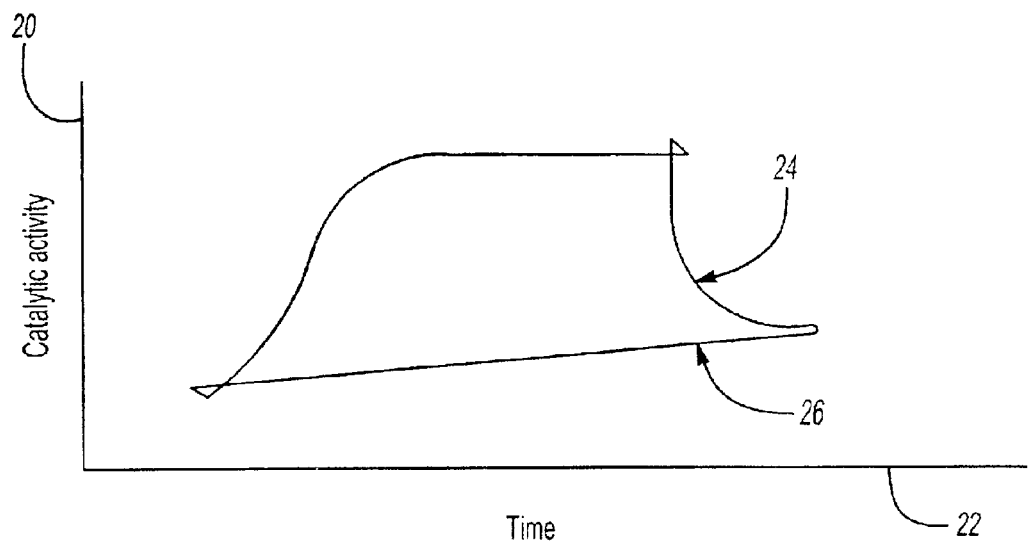
FIG. 1 illustrates a graph of catalytic activity as a function of time when applying a voltage or current onto the catalyst.
Figure 1:
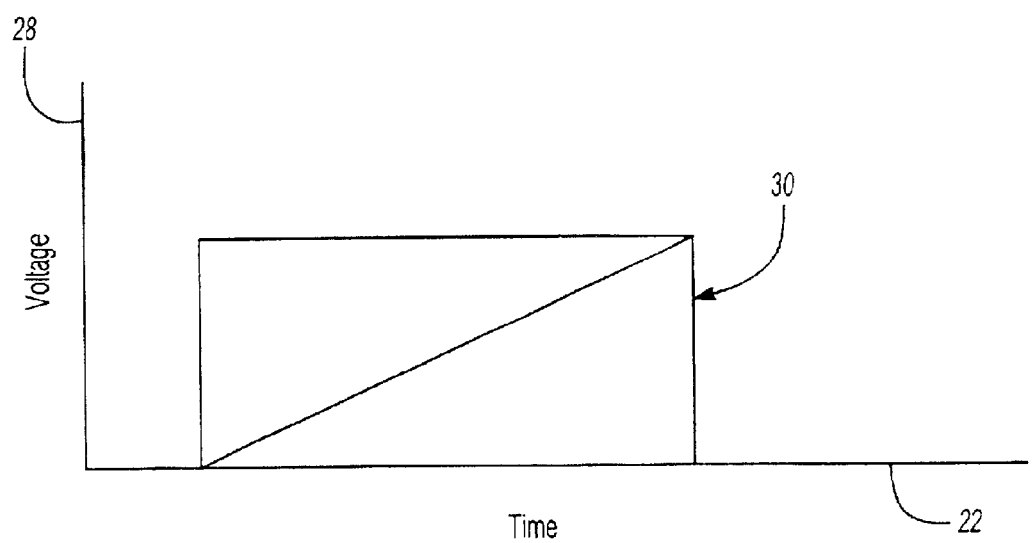

Dynamic response of the electrochemical promotion is also known in the prior art. The electrochemical promotion effect typically increases exponentially with time during galvanostatic transients as is illustrated in FIG. 1. A time constant (i.e., the time required for the catalytic rate change to increase to 63% of its steady state value) is shown using the expression:

$$\tau=2FN/i$$

where N is a reactant's uptake of the catalyst, F is Faradaic constant, and i is an applied current. The prior art indicates that $\tau$ is around 1 minute while i is in the $\mu$A to several tenth $\mu$A range. The inventors of the present invention have not tested the time constant rates for higher currents.

According to the equation described above, it seems possible to reduce the time constant to a one-second range by increasing the current applied to the catalyst. An interesting phenomenon is that even after the applied voltage has been removed, catalytic activity is still bigger than that before applying the voltage.

FIG. 1 illustrates catalytic activity 20 as a function of time 22. Curve 24 shows catalytic activity with electrochemical promotion compared to open-circuit catalytic activity. When applying a voltage or current, AC or DC, on to the catalyst, its catalytic activity is increased greatly. When the voltage or current, AC or DC, is removed, its catalytic activity is gradually reduced. FIG. 1 also illustrates voltage 28 as a function of the same time 22 with line 30 showing catalytic activity.

Under experimental conditions, temperature varies with solid electrolyte used. Experiments are known in the prior art for room temperature to 850° C. The reactants used for electrochemical promotion method are in a gaseous state. Most prior art use pressure numbers—1 kPa to 500 kPa; and only a few give gaseous reactant flow rate data. Some studies mention flow rates between 0.085 liter STP/m and 0.5 liter STP/m.

Electrochemical promotion is also known in the prior art for CO oxidation. See generally, M. Stoukides and C. G. Vayenas, J. Catal., 70(1981)137. G. Vayenas et al., in Modern Aspects of Electrochemistry, Number 29, J. O. Bockris et al., Eds., p. 57(1996); O. A. Marina and V. A. Sobyanin, Catal. Lett., 13(1992)61; and I. V. Yentekakis and C. G. Vayenas, J. Catal., 149(1994)238. These studies showed enhanced CO oxidation using, for example, Pt, Rh, Au, Cu/ZnO, Cu/CuO, ABO3 (perovskite), zeolite, and Pd catalysts (but not only limited to these catalysts) with electrochemical promotion technique. CO catalytic reaction can be increased several times by changing catalysts' working function with an electrochemical method. Unfortunately, no one has tried to modify this technique and combine it with a fuel processing technique for hydrogen production of the present invention. Nevertheless, a recent report showed use of an electrochemical technique to remove CO by a proton exchange membrane (PEM) type reactor. See generally, D. J. Liu et al, SAE Technical paper, 2000-01-0379. This report indicated that an electrocatalytic oxidation approach could reduce CO effectively. However, this method needs specific levels of electric power. U.S. Pat. No. 5,976,724 to Bloomfield, has also proposed an electrochemical autothermal reformer for hydrogen production by using electrochemical technique for CO removal.

Figure 2:
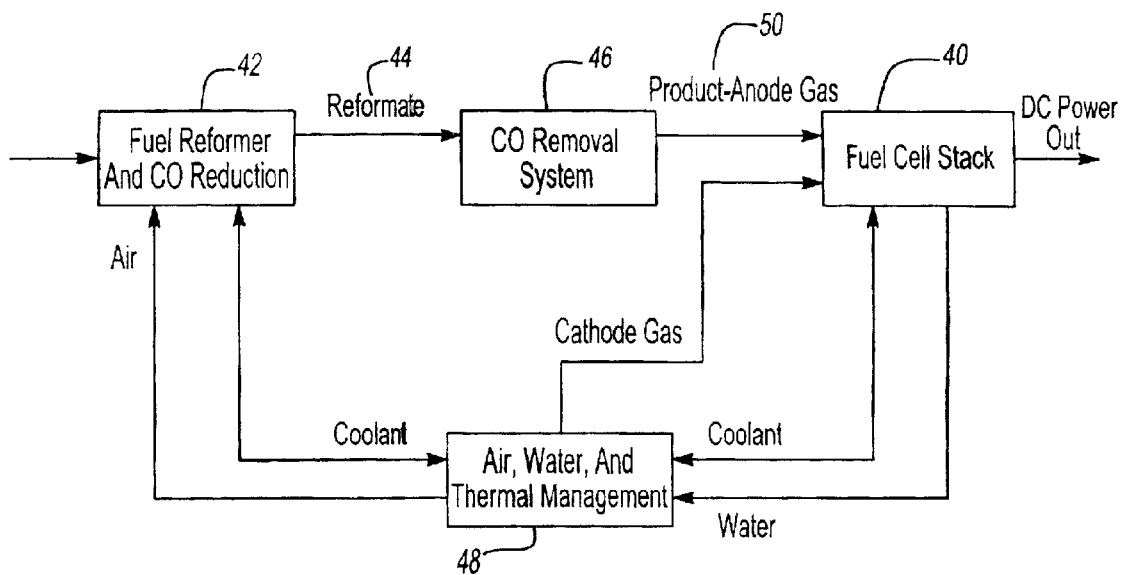
FIG. 2 illustrates a schematic fuel cell power generation chain with the CO removal system of the present invention.

The present invention applies an electrochemical promotion technique in CO clean-up reactor for fuel processor in a hydrogen fuel cell system and is shown generally in FIG. 2. In FIG. 2, a PEM fuel cell stack 40 uses hydrogen for fuel. The hydrogen comes from a fuel reformer 42. Reformate 44 from the fuel reformer 42 contains a high concentration of CO. As such, the reformate 44 cannot be used by the fuel cell stack 40. As previously described in the prior art, the fuel cell stack 40 needs low CO concentrations. The CO contained in reformate 44 can poison the catalyst, such as, for example, Pt, Rh, Au, Cu/ZnO, Cu/CuO, ABO3 (perovskite), zeolite, or Pd (not shown), in the fuel cell stack 40 and reduce the overall fuel cell performance. Therefore, a CO removal system 46 is added and a resulting product (anode gas) is sent to the fuel cell stack 40.

The prior art technique to remove CO by selective catalytic oxidation with molecular oxygen is simple most cost effective. Most of the catalyst used today for selective CO oxidation requires a very narrow temperature range for the CO removal system 46. Therefore, the clean-up reactor requires very careful cooling and temperature control, thermal management 48. Additionally, the CO removal system 46 operates best at a steady state. This makes application of the prior art fuel cell system to a vehicle difficult. Vehicles are required to operate over very dynamic drive cycles and are seldom at steady state. During the dynamic drive cycle, significant CO spikes may be generated impacting the fuel cell stack 40 performance. The present invention provides a fuel cell system that can work at a relatively wide temperature range while having a good rapid dynamic response. This allows the fuel cell system to respond to load changes in fuel cell applications, especially vehicle applications.

Possible electrocatalytic reactions to remove emissions could be:

$$CO + 1/2O_2 = CO_2;$$

and/or $$CO + H_2O = CO_2 + H_2.$$

Theoretical electrical energy consumption for emission (such as CO) removal during the electrochemical promotion in the CO removal system 46 is small. For example, the theoretical electric energy needed to remove CO (10 g/h) is about 6 W by using a perfluorosulphonate cation exchange membrane such as Nafion electrolyte (electrode overvoltage is not considered in this estimation). Using the electrochemical promotion method, and assuming both the catalytic reaction and electrocatalytic reaction occur in the reactor, the electric power required will be greatly reduced because the catalytic activity is increased. The electric power needed for emission removal with the electrochemical promotion technique is anticipated to be very small.

Figure 3:
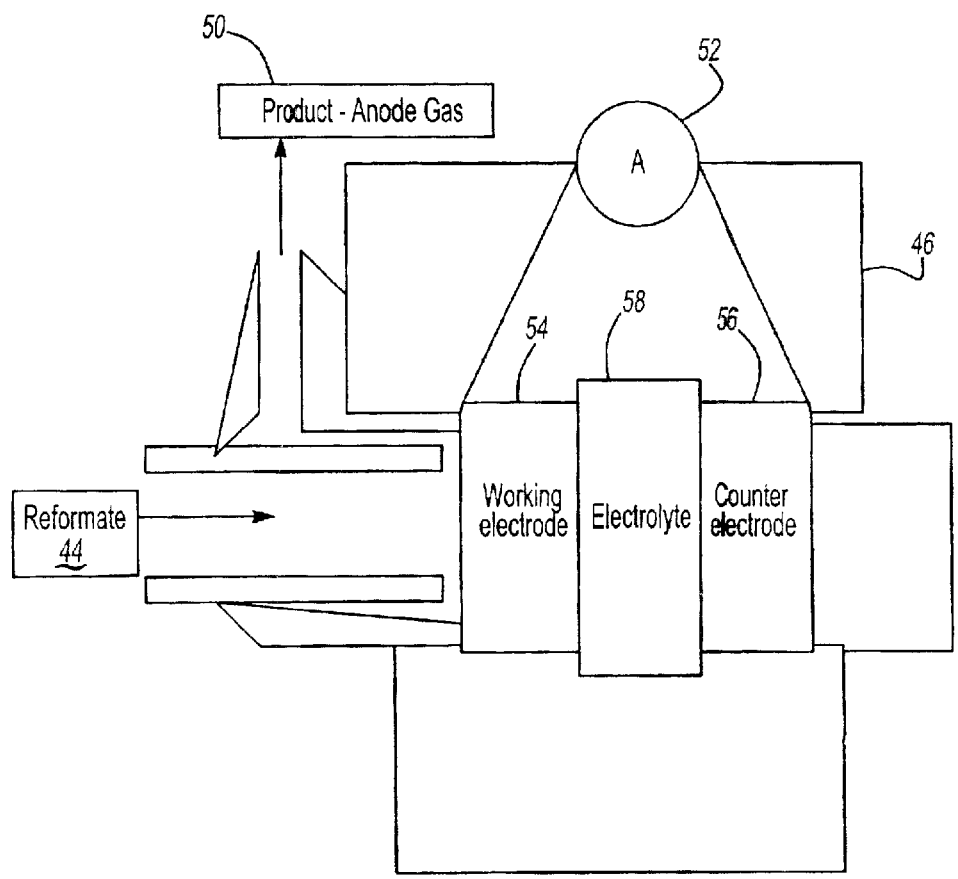
FIG. 3 illustrates a schematic of the CO removal system of the present invention.

The electrochemical promotion effect in the CO removal system 46 is due to controlled migration of ions from an electrolyte to a gas-exposed catalyst electrode surface under an influence of current or potential current. This is more specifically illustrated in FIG. 3 and shows the CO removal system 46 with the reformate 44 processed into the product-anode gas 50. A potentiostat, galvanostat, battery or some other power source (power source) 52 can be used to provide voltage or current, AC or DC, between a catalyst-working electrode 54 and a reference (or counter) electrode 56. Between the catalyst-working electrode 54 and the counter electrode 56 is an electrolyte 58. Since high voltage is not required, in the preferred embodiment the battery (or battery pack) can be the power source 52 and supply a small current to the catalyst for electrochemical promotion. The working electrode 54 serves both electrode and catalyst for the catalytic reaction. Catalysts such as Pt, Rh, Au, Cu/ZnO, Cu/CuO, ABO3 (perovskite), zeolite, and Pd or others should be used for testing. The catalyst and electrolyte selection should meet the requirements that the intrinsic catalytic rate, $r_0$, must be higher than the intrinsic electro-catalytic rate $I_0/2$ F.

The reactor for applying this electrochemical promotion technique should be capable of rapid response (in the one-second range) and can be valid for reactant high flow rate. Increasing current can reduce the dynamic response time constant. Further study is needed to verify that the electrochemical promotion effect is still effective even if gas flow rate is high.

The above-described embodiment of the invention is provided purely for purposes of example. Many other variations, modifications, catalysts, and applications of the invention may be made. In addition, this method not only applies to fuel cell systems but also to any hydrogen production.

We claim:

1. A fuel cell system, comprising:
   a source of a hydrogen fuel;
   a CO removal system using non-Faradaic electrochemical modification of catalyst activity, said removal system including a working electrode, an electrolyte, a counter electrode, and a power source, wherein said working electrode includes a catalyst selected from the group consisting of
   (a) Cu/ZnO
   (b) Cu/CuO
   (c) ABO3
   (d) zeolite; and,
   a fuel stack.

2. The fuel cell system of claim 1 wherein the catalyst is a layer of material formed on the working electrode.

3. The fuel cell system of claim 1, wherein the power source is a DC battery.

4. The fuel cell system of claim 1, wherein the working electrode and the counter electrode are coupled in series with the power source, such that current flows between the working electrode and the counter electrode.

* * * * *